US010442704B2

(12) United States Patent
Bilenko et al.

(10) Patent No.: US 10,442,704 B2
(45) Date of Patent: Oct. 15, 2019

(54) ULTRAVIOLET FLUID DISINFECTION SYSTEM WITH FEEDBACK SENSOR

(71) Applicant: Sensor Electronic Technology, Inc., Columbia, SC (US)

(72) Inventors: Yuri Bilenko, Columbia, SC (US); Alexander Dobrinsky, Loudonville, NY (US); Saulius Smetona, Concord, NC (US); Michael Shur, Latham, NY (US); Remigijus Gaska, Columbia, SC (US); Timothy James Bettles, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 623 days.

(21) Appl. No.: 14/157,874

(22) Filed: Jan. 17, 2014

(65) Prior Publication Data
US 2014/0202962 A1    Jul. 24, 2014

Related U.S. Application Data

(60) Provisional application No. 61/754,005, filed on Jan. 18, 2013.

(51) Int. Cl.
*C02F 1/32* (2006.01)
*C02F 1/00* (2006.01)

(52) U.S. Cl.
CPC ............. *C02F 1/325* (2013.01); *C02F 1/001* (2013.01); *C02F 1/008* (2013.01);
(Continued)

(58) Field of Classification Search
CPC .......... C02F 1/325; C02F 1/001; C02F 1/008; C02F 2201/3222; C02F 2201/3227;
(Continued)

(56) References Cited

U.S. PATENT DOCUMENTS 4,141,830 A    2/1979 Last
4,752,401 A    6/1988 Bodenstein
(Continued)

FOREIGN PATENT DOCUMENTS

JP    2001205281    7/2001
JP    2007069097    3/2007

OTHER PUBLICATIONS

Wurtele et al., "Application of GaN-based ultraviolet-C light emitting diodes—UV LEDs—for water disinfection", Water Research 45, Jun. 15, 2011, p. 1481-1489.
(Continued)

*Primary Examiner* — Robert Clemente
*Assistant Examiner* — Akash K Varma
(74) *Attorney, Agent, or Firm* — LaBatt, LLC

(57) ABSTRACT

A solution for treating a fluid, such as water, is provided. The solution determines an ultraviolet transparency of a fluid before or as the fluid enters a disinfection chamber. In the disinfection chamber, the fluid can be irradiated by ultraviolet radiation to harm microorganisms that may be present in the fluid. One or more attributes of the disinfection chamber, fluid flow, and/or ultraviolet radiation can be adjusted based on the transparency to provide more efficient irradiation and/or higher disinfection rates.

20 Claims, 12 Drawing Sheets

(52) U.S. Cl.
CPC .............. *C02F 2201/326* (2013.01); *C02F 2201/3222* (2013.01); *C02F 2201/3227* (2013.01); *C02F 2201/3228* (2013.01); *C02F 2209/001* (2013.01); *C02F 2209/005* (2013.01); *C02F 2301/028* (2013.01); *C02F 2303/04* (2013.01); *C02F 2307/04* (2013.01)

(58) Field of Classification Search
CPC ........ C02F 2201/3228; C02F 2201/326; C02F 2209/001; C02F 2209/005
USPC ........................................................ 210/745
See application file for complete search history.

(56) References Cited

U.S. PATENT DOCUMENTS

| | | | |
|---|---|---|---|
| RE34,513 E | 1/1994 | Ellner | |
| 5,494,576 A | 2/1996 | Hoppe et al. | |
| 5,503,800 A | 4/1996 | Free | |
| 6,312,608 B1* | 11/2001 | Buckner | A23L 2/50 210/748.03 |
| 6,607,668 B2 | 8/2003 | Rela | |
| 6,607,672 B2 | 8/2003 | Koslow et al. | |
| 6,773,610 B2 | 8/2004 | Korin | |
| 6,974,958 B2 | 12/2005 | Gadgil et al. | |
| 7,029,587 B2 | 4/2006 | Andrews | |
| 7,217,933 B2 | 5/2007 | Gadgil et al. | |
| 7,364,654 B2 | 4/2008 | Schulz | |
| 7,476,870 B2 | 1/2009 | Hopaluk et al. | |
| 7,553,456 B2 | 6/2009 | Gaska et al. | |
| 7,634,996 B2 | 12/2009 | Gaska et al. | |
| 7,691,265 B2 | 4/2010 | Snyder | |
| 7,713,496 B2 | 5/2010 | Harris | |
| 7,862,728 B2 | 1/2011 | Yencho | |
| 8,277,734 B2 | 10/2012 | Koudymov et al. | |
| 9,061,082 B2 | 6/2015 | Gaska et al. | |
| 9,138,499 B2 | 9/2015 | Bettles et al. | |
| 9,179,703 B2 | 11/2015 | Shur et al. | |
| 2003/0071225 A1* | 4/2003 | Boehme | C02F 1/325 250/432 R |
| 2004/0135089 A1* | 7/2004 | Manz | G01N 21/532 250/343 |
| 2006/0186059 A1 | 8/2006 | Saccomanno et al. | |
| 2007/0159067 A1* | 7/2007 | Yun | C09K 11/584 313/503 |
| 2008/0061005 A1 | 3/2008 | Hopaluk et al. | |
| 2009/0084734 A1* | 4/2009 | Yencho | C02F 1/325 210/741 |
| 2009/0250626 A1* | 10/2009 | Schlesser | A61L 2/0011 250/455.11 |
| 2010/0209294 A1 | 8/2010 | Owen et al. | |
| 2011/0297844 A1* | 12/2011 | Vecziedins | C02F 1/325 250/432 R |
| 2013/0048545 A1 | 2/2013 | Shatalov et al. | |
| 2013/0270429 A1 | 10/2013 | Bilenko et al. | |
| 2014/0060094 A1 | 3/2014 | Shur et al. | |
| 2014/0060095 A1 | 3/2014 | Shur et al. | |
| 2014/0060096 A1 | 3/2014 | Shur et al. | |
| 2014/0060104 A1 | 3/2014 | Shur et al. | |

OTHER PUBLICATIONS

Bohrerova et al., "Assessment of DNA damage and repair in Mycobacterium terrae after exposure to UV irradiation", Journal of Applied Microbiology, Nov. 13, 2005, p. 995-1001.

Bank et al., "Bactericidal Effectiveness of Modulated UV Light", Applied and Environmental Microbiology, Dec. 1990, vol. 56, No. 12, p. 3888-3889.

Greene et al., "Computational Fluid Dynamics Analysis of the Effects of Reactor Configuration on Disinfection Efficiency", Water Environment Research, vol. 78, No. 9, Sep. 2006, p. 909-919.

Linden et al., "Enhanced UV Inactivation of Adenoviruses under Polychromatic UV Lamps", Applied and Environmental Microbiology, Dec. 2007, p. 7571-7574.

Wu et al., "Fabrication of hydrophobic alumina aerogel monoliths by surface modification and ambient pressure drying", Applied Surface Science 256, Nov. 2010, p. 5973-5977.

Hijnen et al., "Inactivation credit of UV radiation for viruses, bacteria and protozoan (oo)cysts in water: A review", Water Research 40, (2006), Nov. 30, 2004, p. 3-22.

Bowker et al., "Microbial UV fluence-response assessment using a novel UV-LED collimated beam system", Water Research 45 (2011), Sep. 10, 2010, p. 2011-2019.

Wolfe, "Ultraviolet disinfixtion of potable water: Current technology and research needs", Environ. Scl. Technol., vol. 24, No. E, 1990, p. 768-773.

Science Applications International Corp., "Ultraviolet Light Disinfection Technology in Drinking Water Application—An Overview", Sep. 1996, 270 pages.

Vilhunen et al., "Ultraviolet light-emitting diodes in water disinfection", Environ. Sci. Pollut. Res. (2009), 16, p. 439-442.

Kano et al., "UV Technologies in Water Purification Systems", The R&D Notebook, Feb. 2003, 12 pages.

Lee, International Search Report and Written Opinion for International Application No. PCT/US2012/052006, Jan. 3, 2013, 12 pages.

\* cited by examiner

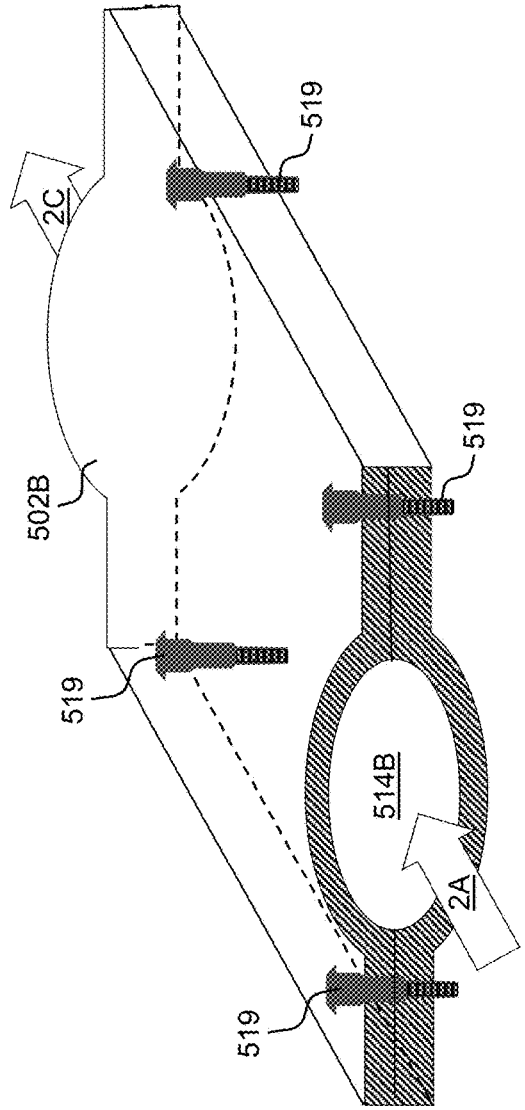
FIG. 5A
FIG. 5B

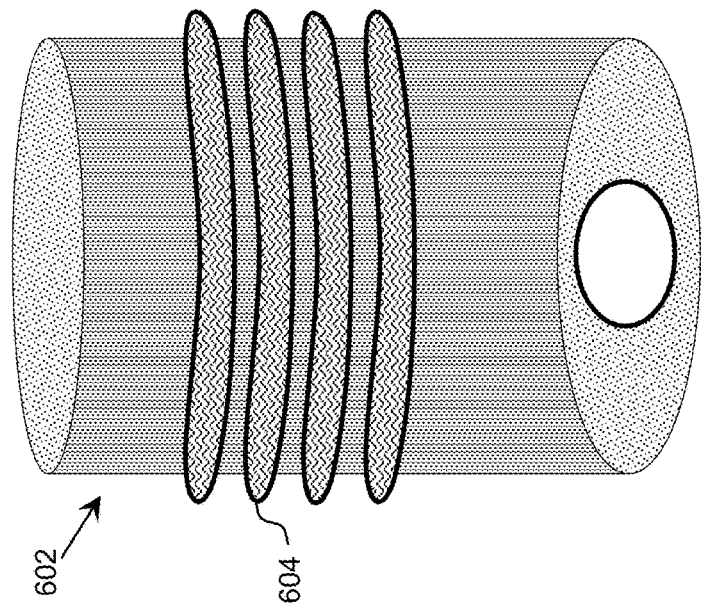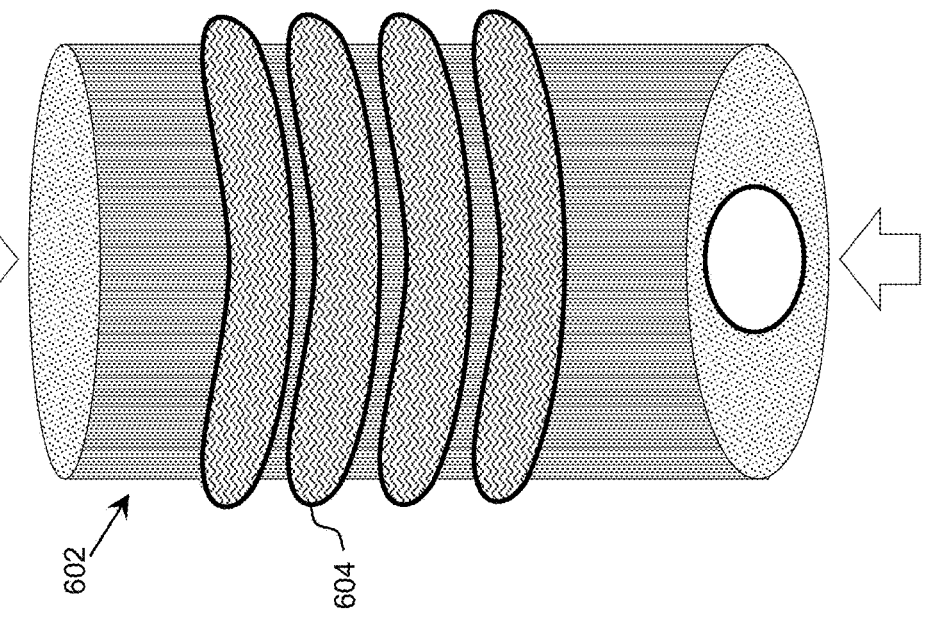

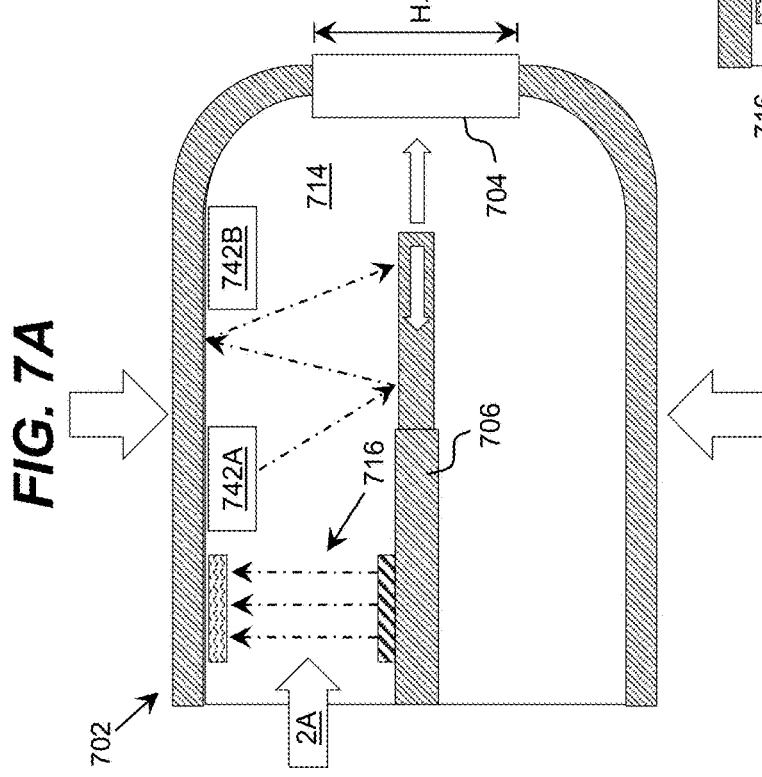
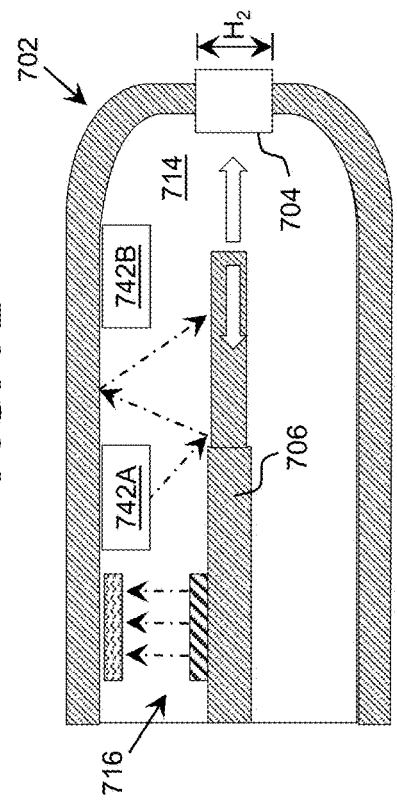
FIG. 7A
FIG. 7B

ULTRAVIOLET FLUID DISINFECTION SYSTEM WITH FEEDBACK SENSOR

REFERENCE TO RELATED APPLICATIONS

The current application claims the benefit of U.S. Provisional Application No. 61/754,005, titled "Ultraviolet Water Disinfection System with Feedback Sensor," which was filed on 18 Jan. 2013, and which is hereby incorporated by reference. Aspects of the invention are related to co-pending U.S. patent application Ser. No. 13/591,728, which was filed on 22 Aug. 2012, and which is hereby incorporated by reference.

TECHNICAL FIELD

The disclosure relates generally to disinfection, and more particularly, to a solution for disinfecting a fluid, such as water, using deep ultraviolet light.

BACKGROUND ART

Water treatment using ultraviolet (UV) radiation offers many advantages over other forms of water treatment, such as chemical treatment. For example, treatment with UV radiation does not introduce additional chemical or biological contaminants into the water. Furthermore, ultraviolet radiation provides one of the most efficient approaches to water decontamination since there are no microorganisms known to be resistant to ultraviolet radiation, unlike other decontamination methods, such as chlorination. UV radiation is known to be highly effective against bacteria, viruses, algae, molds and yeasts. For example, hepatitis virus has been shown to survive for considerable periods of time in the presence of chlorine, but is readily eliminated by UV radiation treatment. The removal efficiency of UV radiation for most microbiological contaminants, such as bacteria and viruses, generally exceeds 99%. To this extent, UV radiation is highly efficient at eliminating $E$-$coli$, Salmonella, Typhoid fever, Cholera, Tuberculosis, Influenza Virus, Polio Virus, and Hepatitis A Virus.

Intensity, radiation wavelength, and duration of radiation are important parameters in determining the disinfection rate of UV radiation treatment. These parameters can vary based on a particular target culture. The UV radiation does not allow microorganisms to develop an immune response, unlike the case with chemical treatment. The UV radiation affects biological agents by fusing and damaging the DNA of microorganisms, and preventing their replication. Also, if a sufficient amount of a protein is damaged in a cell of a microorganism, the cell enters apoptosis or programmed death. FIG. 1 shows an illustrative germicidal effectiveness curve of ultraviolet radiation according to the prior art. As illustrated, the most lethal radiation is at wavelengths of approximately 260 nanometers.

Ultraviolet radiation disinfection using mercury based lamps is a well-established technology. In general, a system for treating water using ultraviolet radiation is relatively easy to install and maintain in a plumbing or septic system. Use of UV radiation in such systems does not affect the overall system. However, it is often desirable to combine an ultraviolet purification system with another form of filtration since the UV radiation cannot neutralize chlorine, heavy metals, and other chemical contaminants that may be present in the water. Various membrane filters for sediment filtration, granular activated carbon filtering, reverse osmosis, and/or the like, can be used as a filtering device to reduce the presence of chemicals and other inorganic contaminants.

Mercury lamp-based ultraviolet radiation disinfection has several shortcomings when compared to deep ultraviolet (DUV) light emitting device (LED)-based technology, particularly with respect to certain disinfection applications. For example, in rural and/or off-grid locations, it is desirable for an ultraviolet purification system to have one or more of various attributes such as: a long operating lifetime, containing no hazardous components, not readily susceptible to damage, requiring minimal operational skills, not requiring special disposal procedures, capable of operating on local intermittent electrical power, and/or the like. Use of a DUV LED-based solution can provide a solution that improves one or more of these attributes as compared to a mercury vapor lamp-based approach. For example, in comparison to mercury vapor lamps, DUV LEDs: have substantially longer operating lifetimes (e.g., by a factor of ten); do not include hazardous components (e.g., mercury), which require special disposal and maintenance; are more durable in transit and handling (e.g., no filaments or glass); have a faster startup time; have a lower operational voltage; are less sensitive to power supply intermittency; are more compact and portable; can be used in moving devices; can be powered by photovoltaic (PV) technology, which can be installed in rural locations having no continuous access to electricity and having scarce resources of clean water; and/or the like.

A solution described in U.S. patent application Ser. No. 13/591,728 provides for treating a fluid, such as water. The solution first removes a set of target contaminants that may be present in the fluid using a filtering solution. The filtered fluid enters a disinfection chamber where it is irradiated by ultraviolet radiation to harm microorganisms that may be present in the fluid. An ultraviolet radiation source and/or the disinfection chamber can include one or more attributes configured to provide more efficient irradiation and/or higher disinfection rates.

SUMMARY OF THE INVENTION

Aspects of the invention provide a solution for treating a fluid, such as water. The solution determines an ultraviolet transparency of a fluid before or as the fluid enters a disinfection chamber. In the disinfection chamber, the fluid can be irradiated by ultraviolet radiation to harm microorganisms that may be present in the fluid. One or more attributes of the disinfection chamber, fluid flow, and/or ultraviolet radiation can be adjusted based on the transparency to provide more efficient irradiation and/or higher disinfection rates.

A first aspect of the invention provides a system comprising: a disinfection chamber for treating a fluid, the disinfection chamber including a set of ultraviolet sources located therein; a transparency assembly mounted such that at least a portion of fluid entering or within the disinfection chamber passes through the transparency assembly; and a control component configured to adjust operation of the set of ultraviolet sources based on transparency data for the fluid acquired by the transparency assembly.

A second aspect of the invention provides a system comprising: a disinfection chamber for treating a fluid, the disinfection chamber including a plurality of ultraviolet sources located therein; a transparency assembly mounted such that at least a portion of fluid entering or within the disinfection chamber passes through the transparency assembly; and a control component configured to adjust operation of the set of ultraviolet sources based on transparency data for the fluid acquired by the transparency assembly.

A third aspect of the invention provides a method comprising: directing a fluid into a disinfection chamber, wherein the disinfection chamber includes a set of ultraviolet sources and a transparency assembly, and wherein at least a portion of the fluid within the disinfection chamber passes through the transparency assembly; and a control component dynamically adjusting operation of the set of ultraviolet sources based on transparency data for the fluid acquired by the transparency assembly.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 5A and 5B show illustrative housings forming disinfection chambers according to embodiments.

FIGS. 6A and 6B show an illustrative housing capable of adjusting a length of the disinfection chamber according to an embodiment.

FIGS. 7A and 7B show an illustrative housing capable of adjusting a width of the disinfection chamber according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for treating a fluid, such as water. The solution determines an ultraviolet transparency of a fluid before or as the fluid enters a disinfection chamber. In the disinfection chamber, the fluid can be irradiated by ultraviolet radiation to harm microorganisms that may be present in the fluid. One or more attributes of the disinfection chamber, fluid flow, and/or ultraviolet radiation can be adjusted based on the transparency to provide more efficient irradiation and/or higher disinfection rates. As used herein, unless otherwise noted, the term "set" means one or more (i.e., at least one) and the phrase "any solution" means any now known or later developed solution.

Aspects of the invention are designed to improve the efficiency with which ultraviolet radiation is absorbed by a fluid, such as water. The improved design can provide a higher disinfection rate while requiring less power, making operation of the overall system more efficient. In a particular embodiment, the fluid is water and the system is configured to provide a reduction of microorganism (e.g., bacterial and/or viral) contamination in the water by at least a factor of two. In a more particular embodiment, the system provides approximately 99.9% decontamination of the water.

Figure 1:
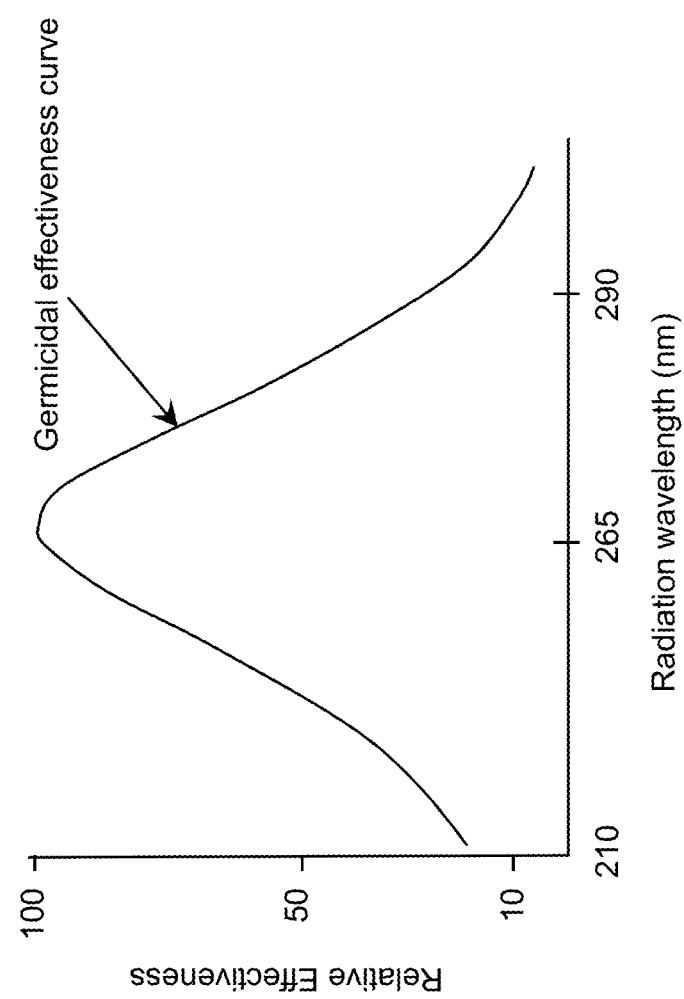
FIG. 1 shows an illustrative germicidal effectiveness curve of ultraviolet radiation according to the prior art.
Figure 2:
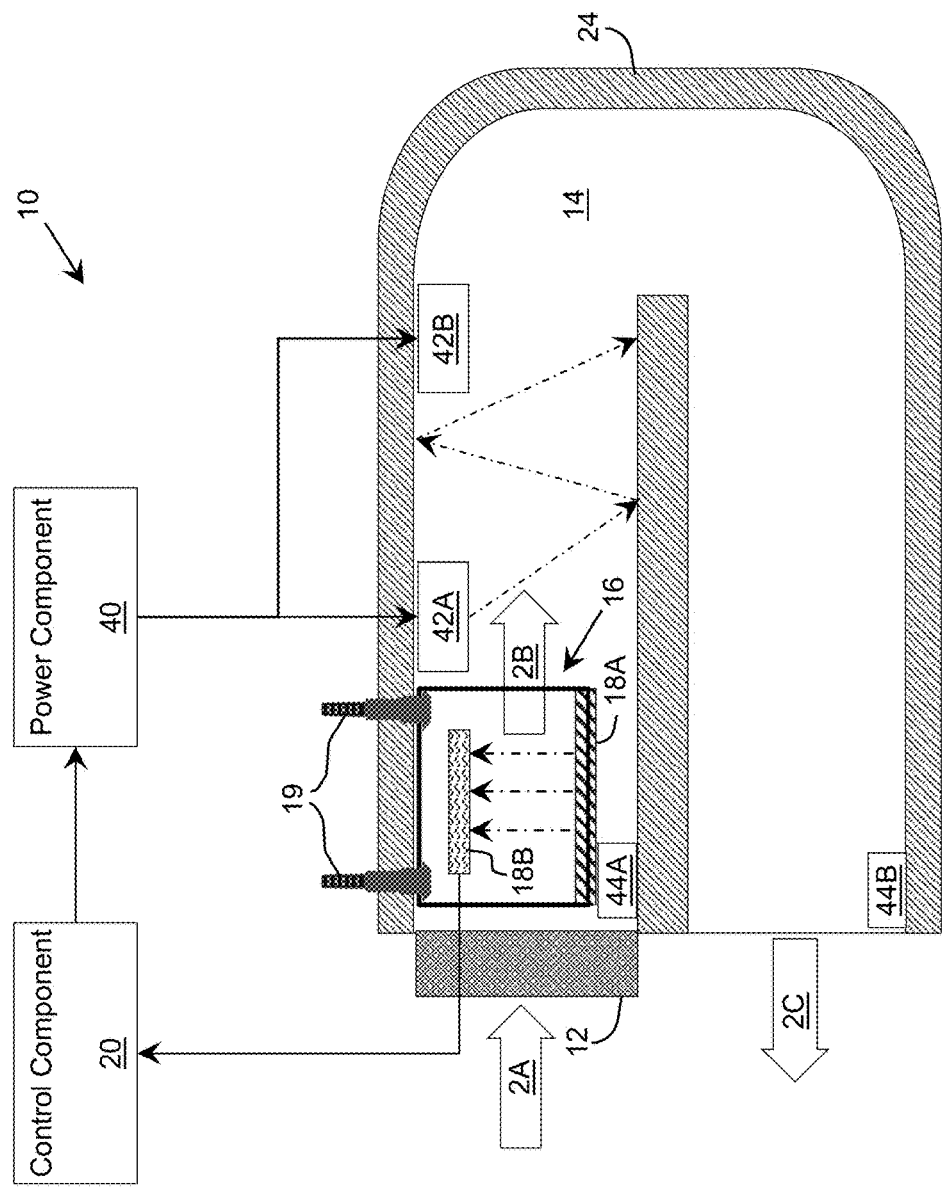
FIG. 2 shows an illustrative system for treating a fluid according to an embodiment.

Turning to the drawings, FIG. 2 shows an illustrative system 10 for treating a fluid 2A according to an embodiment. In particular, the system 10 includes a filtering unit 12 and a disinfection chamber 14. During operation of the system 10, unfiltered fluid 2A can enter the filtering unit 12 through an inlet of the filtering unit 12 and filtered fluid 2B can exit the filtering unit 12. As illustrated, the filtering unit 12 can be located at an inflow of the disinfection chamber 14 such that the filtered fluid 2B enters directly into the disinfection chamber 14 through an outlet of the filtering unit 12. In an embodiment, the inlet and outlet of the filtering unit 12 are permeable sides of the filtering unit 12, as illustrated. Furthermore, disinfected fluid 2C can exit the disinfection chamber 14 after being irradiated as described herein.

The fluid 2A-2C can comprise any type of fluid, including a liquid or a gas. In an embodiment, the fluid 2A-2C is water, which can be treated to make the water potable. To this extent, as used herein, the terms "purification," "decontamination," "disinfection," and their related terms mean treating the fluid 2A-2C so that it includes a sufficiently low number of contaminants (e.g., chemical, sediment, and/or the like) and microorganisms (e.g., virus, bacteria, and/or the like) so that the fluid is safe for a desired interaction with a human or other animal. For example, the purification, decontamination, or disinfection of water means that the resulting water has a sufficiently low level of microorganisms and other contaminants so that a typical human or other animal can consume the water without suffering adverse effects from microorganisms and/or contaminants present in the water. A target level of microorganisms and/or contaminants can be defined, for example, by a standards setting organization, such as a governmental organization.

The filtering unit 12 can comprise any combination of one or more of various types of filter materials and filtering solutions capable of removing one or more of various target contaminants that may be present in the fluid 2A as it passes there through. For example, the filtering unit 12 can comprise a sediment filter, which can comprise a filter material having a lattice structure, or the like, which is configured to remove target contaminants of a minimum size that may be present within the fluid 2A. Furthermore, the filtering unit 12 can comprise a filter material capable of removing one or more target contaminants by adsorption. For example, the filter material can comprise activated carbon, an ion exchange resin, or the like, and can be in the form of a ceramic, a block (e.g., carbon block), a granular fill, and/or the like. In this case, the filter material can remove various chemical contaminants, such as heavy metals, chlorine, and/or the like, which may be present in the fluid 2A. Regardless, it is understood that the filtering unit 12 can incorporate any combination of one or more filtering solutions including, for example, reverse osmosis, membrane filtration (e.g., nanofiltration), ceramic filtration, sand filtration, ultrafiltration, microfiltration, ion-exchange resin, and/or the like.

In any event, when in the disinfection chamber 14, the filtered fluid 2B can be further treated by ultraviolet radiation. In an embodiment, the system 10 is configured to adjust one or more attributes of the radiation based on a transparency of the filtered fluid 2B to radiation of the target wavelength. To this extent, the disinfection chamber 14 is shown including a transparency assembly 16, which can be configured to acquire data corresponding to a transparency of the filtered fluid 2B. In particular, the transparency assembly 16 can be configured such that at least a portion of the filtered fluid 2B passes there through. Additionally, the transparency assembly 16 can include a set of radiation sources 18A, which generate radiation of one or more target wavelengths directed toward a set of radiation sensors 18B. In an embodiment, the set of radiation sources 18A includes at least one visible light emitting device and at least one ultraviolet light emitting device, while the set of radiation sensors 18B includes at least one visible light sensitive sensing device and at least one ultraviolet radiation sensitive sensing device. As illustrated, the transparency assembly 16 can comprise a housing having two open ends through which the filtered fluid 2B passes with a set of radiation sources 18A located on one side and a set of radiation sensors 18B located on the opposing side.

The set of radiation sensors 18B can provide transparency data corresponding to a transparency of the filtered fluid 2B as a set of inputs for a control component 20. Based on the set of inputs, the control component 20 can adjust one or more aspects of the operation of a set of ultraviolet sources 42A, 42B used to treat the filtered fluid 2B. For example, the control component 20 can adjust one or more attributes of the power provided to the set of ultraviolet sources 42A, 42B by a power component 40. The power component 40 can be configured to independently or collectively adjust an amount of power provided to each ultraviolet source 42A, 42B. The power component 40 can be capable of delivering various energy levels of power to the ultraviolet sources 42A, 42B in a continuous and/or pulsed manner. In an embodiment, the control component 20 includes a computer system, which is configured to calculate an ultraviolet radiation absorption of the filtered fluid 2B based on the transparency data received from the set of radiation sensors 18B. While not shown for clarity, it is understood that an embodiment of the control component 20 can be configured to control the operation of one or more additional components, including the set of radiation sources 18A, the set of radiation sensors 18B, a mechanism (e.g., pump) for managing movement of the fluid 2A-2C, and/or the like. Similarly, an embodiment of the control component 20 can receive input data from one or more additional sensing devices, such as a flow rate sensor, a sensor indicating that the disinfection chamber 14 is closed, and/or the like.

In an embodiment, the ultraviolet sources 42A, 42B includes a set of ultraviolet light emitting diodes (LEDs), each of which is configured to emit radiation having a peak wavelength within the ultraviolet range of wavelengths, i.e., between 400 nanometers (nm) and 100 nm. In a more particular embodiment, the ultraviolet radiation emitted by an ultraviolet LED comprises deep ultraviolet radiation having a peak wavelength below 300 nanometers (nm). In a still more particular embodiment, the ultraviolet radiation emitted by an ultraviolet LED has a peak wavelength in a range between approximately 250 nm and approximately 290 nm. In another embodiment, the ultraviolet radiation sources 42A, 42B includes a plurality of ultraviolet LEDs having a plurality of distinct peak wavelengths within the deep ultraviolet range of wavelengths, which can improve germicidal efficiency for targeting a plurality of types of microorganisms that may be present in the filtered fluid 2B. The ultraviolet radiation can be introduced into the disinfection chamber 14 using any solution. For example, the ultraviolet sources 42A, 42B can comprise ultraviolet LEDs placed along an interior surface of a wall forming the disinfection chamber 14. Furthermore, waveguide structures, such as optical fiber, or the like, can be utilized to introduce ultraviolet radiation generated by an ultraviolet source located external of the disinfection chamber 14.

As different pathogens have various absorption wavelengths (for example, MS2 Phage has an absorption maxima at 271 nm, and *Escherichia coli* at 267 nm), an embodiment of the system 10 can include ultraviolet sources 42A, 42B operating at various wavelengths. For example, the disinfection chamber 14 can contain ultraviolet sources 42A, 42B containing phosphor and emitting at least some radiation at 250 nm wavelength, with the phosphor converting a portion (e.g., at least five percent) of the emitted UV radiation into ultraviolet radiation having a 280 nm wavelength. In addition, a peak wavelength of an ultraviolet source 42A, 42B can be chosen to provide a maximum absorption for a target pathogen. For instance, ultraviolet sources 42A, 42B with several wavelength spectra comprising wavelength maxima at 250, 260, 265, 270 and 280 nm, with a full width at half maximum (FWHM) of ten nm or twenty nm can be included in the system 10. More particular illustrative embodiments of configurations of the ultraviolet sources 42A, 42B include: at least two wavelength spectra having maxima at 265 nm and 250 nm with a FWHM of ten nm; at least two wavelength spectra having maxima at 250 nm and 270 nm with FWHM of ten nm; and at least two wavelength spectra having maxima at 260 nm and 280 nm and FWHM of twenty nm. During operation of the system 10, the control component 20 can operate all of the ultraviolet sources 42A, 42B or selectively operate only a subset of the ultraviolet sources 42A, 42B based on a set of target contaminants and their corresponding absorption wavelengths.

The disinfection chamber 14 can include one or more attributes to improve the efficiency of the ultraviolet irradiation. To this extent, the disinfection chamber 14 can be formed by chamber walls 24 having an interior surface composed of an ultraviolet reflective material (e.g., mirror), which will provide increased scattering of the ultraviolet radiation within the disinfection chamber 14 and a reduced loss of ultraviolet radiation from the disinfection chamber 14. For example, the chamber walls can comprise a low index of refraction layer of material covering a layer of reflective material. In an embodiment, the layer of reflective material is formed of an aluminum-based material, such as alumina, which has a relatively high reflectivity coefficient for ultraviolet radiation. The low index of refraction layer of material can be formed of any type of material having a lower index of refraction than the filtered fluid 2B, including: aerogel; a composite material comprising, for example, a layer of air and a thin layer of fused silica; and/or the like. Inclusion of the low refraction layer will cause the ultraviolet radiation to be totally internally reflected (TIR) at an interface between the filtered fluid 2B and the low refraction layer for rays of ultraviolet radiation propagating at angles to the interface normal that are greater than TIR angles.

The system 10 can include one or more additional components to ensure that the fluid 2C is completely disinfected in an efficient manner. To this extent, the system 10 can be configured to provide a target (e.g., optimal) time dependence of ultraviolet exposure and/or contamination level detection to treat the fluid 2C. For example, the system 10 can include one or sensors 44A, 44B for acquiring contamination data corresponding to a contamination level (e.g., biological activity level, chemical level, and/or the like) of the fluid. For example, such a sensor 44A can be located prior to or at the beginning of the disinfection chamber 14. When located prior to the disinfection chamber 14, the system 10 can include a valve that can be operated by the control component 20 to cause the fluid 2A to bypass the disinfection chamber 14 when no contamination is detected. Alternatively, the fluid 2A can flow through the disinfection chamber 14 and the control component 20 can not operate the ultraviolet sources 42A, 42B or operate them at a low intensity to provide a maintenance dose of ultraviolet radiation onto the filtered fluid 2B. Additionally, the system 10 can include a sensor 44B for detecting a contamination level of the disinfected fluid 2C as it exits the disinfection chamber 14. In response to detecting some residual contamination, the control component 20 can operate a valve to recirculate the disinfected fluid 2C through the disinfection chamber 14 and/or adjust operation of the ultraviolet sources 42A, 42B to provide an increased dose of ultraviolet radiation to the filtered fluid 2B. In this manner, the system 10 can repeatedly treat the fluid 2B depending on a time dependence of the contamination level.

In an embodiment, the system 10 can utilize photoluminescence to detect the presence and/or density of a microorganism present in the fluid. For example, a sensor 44A, 44B can comprise an ultraviolet fluorescence sensor, an ultraviolet absorbance sensor, and/or the like. In this case, the sensor 44A, 44B can be placed in the disinfection chamber 14 away from the UV radiation beam paths (e.g., located on an interior wall of the disinfection chamber 14). The UV fluorescence sensor 44A, 44B can acquire data corresponding to a scattering of UV radiation within the disinfection chamber 14. The control component 20 can process the data corresponding to the scattering of UV radiation to correlate it with a level of contamination in the fluid 2B, and make any adjustments to the operation of the ultraviolet sources 42A, 42B accordingly. Similarly, the control component 20 can process data acquired by the sensor 44A, 44B to maintain a target level of ultraviolet flux within the disinfection chamber 14.

In an embodiment, the control component 20 operates the ultraviolet sources 42A, 42B in a pulsed manner. For example, the control component 20 can cause the power component 40 to provide pulsed electrical power to the ultraviolet sources 42A, 42B. A frequency of pulsation and the ultraviolet radiation intensity can be configured to provide a target amount of sterilization. The pulsed operation criteria can be determined in advance, e.g., by testing the disinfection chamber 14 for various contaminants and fluid 2B transparency levels and recording the frequency of pulsation, the intensity of pulsed ultraviolet light, and sterilization levels for each frequency/intensity value in a database stored in the control component 20. The time dependent pulsation and intensity adjustment does not have to be periodic, but can be aperiodic, contain pulses of different wavelengths and different intensities etc. The employed pulses can be from different ultraviolet sources 42A, 42B, and can include, for example, a combination of DUV LED(s), DUV laser(s), and/or DUV lamp(s).

Figure 3:
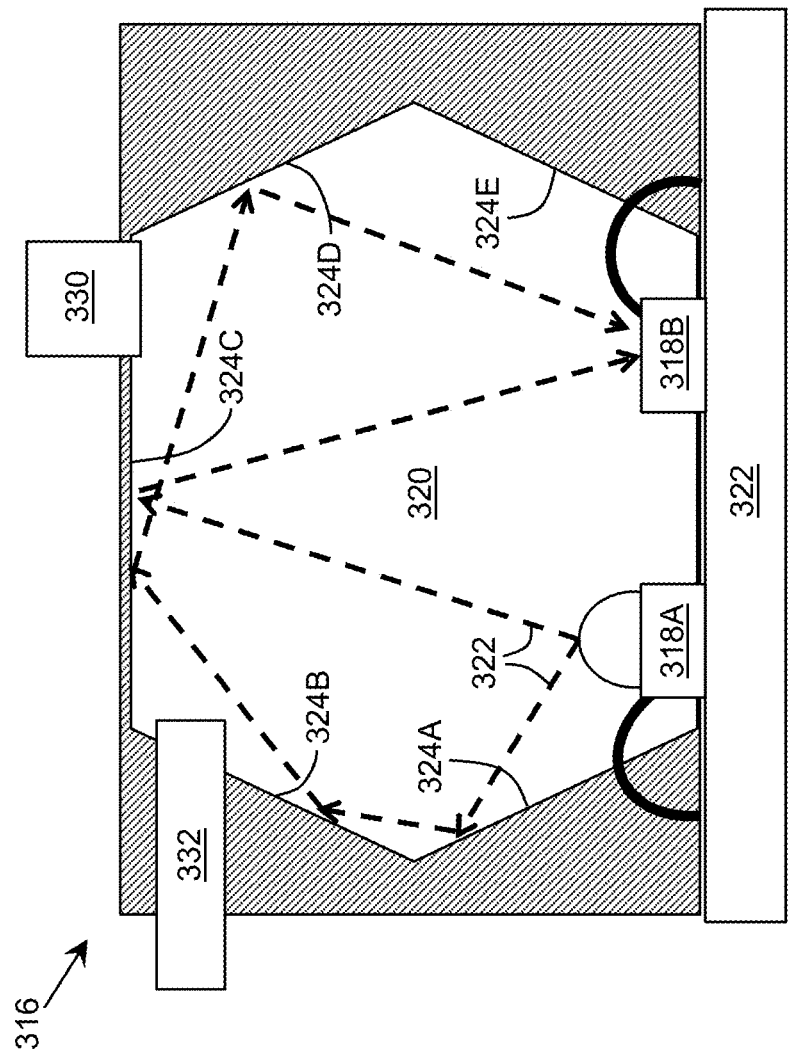
FIG. 3 shows an illustrative transparency assembly according to an embodiment.

In an embodiment, the transparency assembly 16 is configured to provide data more sensitive to changes in a transparency of the filtered fluid 2B. For example, FIG. 3 shows an illustrative transparency assembly 316 according to an embodiment. In this case, the transparency assembly 316 includes a chamber 320, a radiation source 318A and a radiation sensor 318B, both of which are located in a close proximity to each other on a chamber floor 322. As illustrated, the radiation source 318A can be configured to emit radiation (e.g., ultraviolet light) 322 into the chamber 320, and the radiation sensor 318B can be configured to detect the radiation 322 after it travels through the chamber 320 and reflects off of one or more of the chamber walls 324A-324E. In this configuration, an effective optical path that the radiation 322 emitted by the radiation source 318A travels before impinging the ultraviolet detector 318B is increased without enlarging an overall volume of the chamber 320 as compared to the transparency assembly 16 shown in FIG. 2. By increasing the effective optical path of the radiation 322, changes in the transparency of the fluid have more of an effect on the detected radiation 322.

When acquiring measurement data, the fluid can enter the chamber 320 through an inlet 330 and exit the chamber 320 through an outlet 332. However, it is understood that the size and orientation of the inlet 330 and outlet 332 are only illustrative, and any configuration of an inlet and outlet can be utilized. Additionally, the radiation source 318A can be operated (e.g., by the control component 20 shown in FIG. 2) in a pulsed mode delivering maximum ultraviolet power into the chamber 320. For example, the pulsed mode can have a frequency up to approximately one gigahertz, and can assist in filtering noise in the data acquired by the ultraviolet sensor 318B. The chamber 320 can have any size. For example, the chamber 320 can have dimensions between approximately ten and approximately thirty cubic centimeters.

The chamber 320 is shown formed by the chamber floor 322 and a plurality of chamber walls 324A-324E. In an embodiment, the chamber floor 322 comprises a material having a low thermal expansion. For example, the material can comprise a metal, such as that used in the transistor outline (TO) package, TO-39, or a similar package. The chamber floor 322 can include one or more components for use in connecting each of the radiation devices 318A, 318B to a circuit (e.g., the control component 20 shown in FIG. 2). The chamber walls 324A-324E can be formed of any suitable material. The material can be reflective of ultraviolet radiation having the target wavelength and/or can be coated with a material reflective of ultraviolet radiation. In either case, the chamber walls 324A-324E can be reflective of ultraviolet and visible radiation. In an embodiment, the chamber walls 324A-324E have at least thirty percent reflectance of visible light at the normal incidence and at least fifty percent reflectance of ultraviolet radiation at the normal incidence. For example, the chamber walls 324A-324E can be formed of or covered by highly ultraviolet-reflective aluminum (e.g., mirror quality aluminum). In a more particular example, the chamber walls 324A-324E can comprise fused silica with evaporated aluminum to product high reflectivity mirrors. Each of the chamber walls 324A-324E is shown having a substantially flat interior surface. However, it is understood that this is only illustrative of various possible configurations of a chamber and chamber walls for the transparency assembly 316.

Returning to FIG. 2, the housing can be readily attached to and removed from the disinfection chamber 14, e.g., for cleaning, replacement, and/or the like. To this extent, the transparency assembly 16 is shown including a housing attached to the disinfection chamber 14 by a pair of bolts 19. However, it is understood that this is only illustrative of various solutions for removably attaching the transparency assembly 16 to the disinfection chamber 14.

Figure 4:
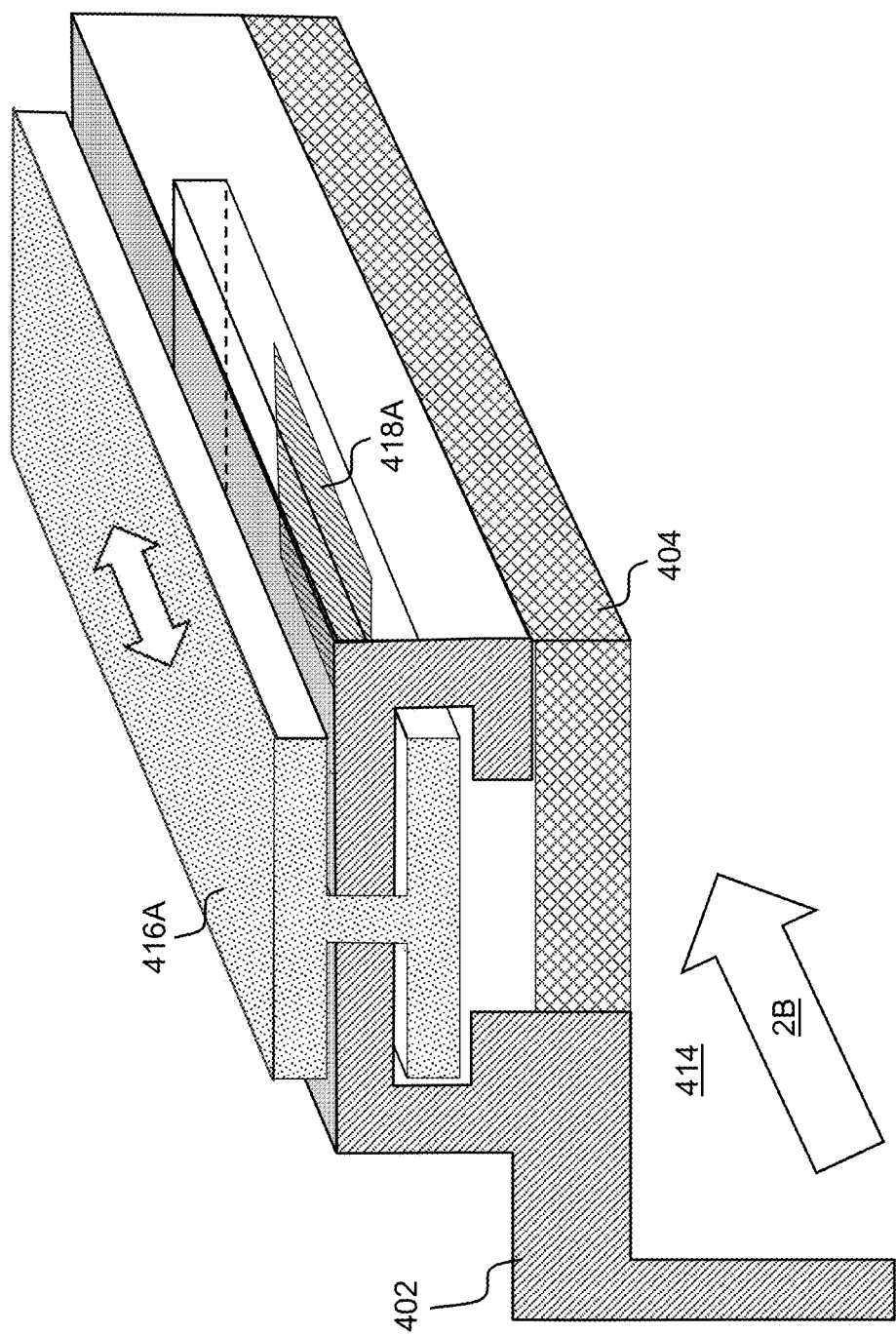
FIG. 4 shows an illustrative structure for removably attaching a component of the transparency assembly according to an embodiment.

To this extent, FIG. 4 shows an illustrative structure 416 for removably attaching a component, such as a radiation source 418A, of the transparency assembly according to an embodiment. As illustrated, a housing 402 forming the chamber 414 through which the filtered fluid 2B passes includes a grooved portion which is configured to removably hold an I-beam structure 416 in place. The I-beam structure 416 includes the radiation source 418A mounted on a surface facing the chamber 414. During operation, the filtered fluid 2B flows past the radiation source 418A. In order to clean, replace, and/or the like, the radiation source 418A, a user can slide the I-beam structure 416 out. In an embodiment, the housing 402 further includes a transparent window 404, which separates the component, such as the radiation source 418A, from the filtered fluid 2B. The transparent window 404 can be configured to allow radiation of the corresponding wavelength(s) to pass there through. In an embodiment, the transparent window 404 allows at least approximately eighty percent of the radiation to pass there through. The housing 402 and transparent window 404 also can be configured so that the transparent window 404 is removable (e.g., using a tongue and groove configuration or the like) for cleaning, replacement, and/or the like. The structure 416 can be located on a first side of a housing 402 forming the chamber 414. While not shown for clarity, a similar structure 416 can be located on an opposing side of the housing 402 for removably holding the complementary component, such as a radiation sensor.

Returning to FIG. 2, it is understood that an embodiment can be implemented without the filtering unit 12. Furthermore, it is understood that a shape of the chamber 14 is only illustrative of various possible shapes. To this extent, FIGS. 5A and 5B show illustrative housings 502A, 502B forming disinfection chambers 514A, 514B, respectively, according to embodiments. In each case, the disinfection chamber 514A, 514B comprises a straight pipe into which fluid 2A enters and from which disinfected fluid 2C exits. The housing 502A, 502B can include a filtering unit located therein, or be implemented without any type of filtering. In each case, the housing 502A, 502B includes one or more ultraviolet radiation sources for disinfecting the fluid 2A as it flows through the disinfection chamber 514A, 514B. Each housing 502A, 502B can include any mechanism for attaching the housing 502A, 502B to another component within which the fluid 2A, 2C is contained, e.g., a threaded end, or the like. As illustrated by housing 502B, the housing 502B can be configured for cleaning, e.g., by having two portions temporarily secured by fasteners 519, which can be removed to provide ready access to an interior of the housing 502B for cleaning, replacement of one or more components, and/or the like.

In an embodiment, a housing can be configured to enable one or more aspects of the ultraviolet radiation within the disinfection chamber to be dynamically adjusted. For example, the housing can be configured to dynamically vary one or more attributes of an optical path of the ultraviolet radiation within the disinfection chamber, such as a length of an optical propagation path (e.g., optical propagation length) of the ultraviolet radiation. In an embodiment, the optical path can be changed by dynamically changing a physical length of the disinfection chamber. To this extent, FIGS. 6A and 6B show an illustrative housing 602 capable of adjusting a length of the disinfection chamber according to an embodiment. In this case, the housing 602 comprises a pipe including a plurality of corrugated sections 604, which can expand and contract to alter the physical dimensions of the disinfection chamber located therein. FIG. 6A shows the housing 602 with the corrugated sections 604 expanded to lengthen the disinfection chamber, while FIG. 6B shows the housing 602 with the corrugated sections 604 contracted to provide a shorter disinfection chamber. The housing 602 can be incorporated in a system including a mechanism for automatically adjusting the length (e.g., as directed by the control component 20 (FIG. 2)) according to one or more parameters of the fluid, ultraviolet radiation, a target optical length of the ultraviolet propagation, and/or the like. In an embodiment, a length of the housing 602 is selected based on an ultraviolet transparency of the fluid. For example, a longer length for the housing 602 can work well for ultraviolet transparent water, while a shorter housing 602 can work well for ultraviolet opaque water. Overall, a distribution of the intensity of ultraviolet light within the disinfection chamber is affected by the length of the housing 602 and resulting relative positions of the ultraviolet sources.

An embodiment of the housing can be configured to adjust a width of a corresponding disinfection chamber. For example, FIGS. 7A and 7B show an illustrative housing 702 capable of adjusting a width of the disinfection chamber 714 according to an embodiment. As illustrated, the housing 702 includes a transparency assembly 716 through which the fluid 2A passes prior to being disinfected by a set of ultraviolet sources 742A, 742B within the disinfection chamber 714. The housing 702 includes an adjustable section 704, which allows the disinfection chamber 714 to be dynamically widened (shown in FIG. 7A) and narrowed (shown in FIG. 7B) within a range of widths corresponding to a height $H_1$ of the adjustable section 704 when fully extended and a height $H_2$ of the adjustable section 704 when fully retracted. In an embodiment, the housing 702 is implemented in a system including a mechanism for automatically adjusting the width (e.g., as directed by the control component 20 (FIG. 2)) according to one or more parameters of the fluid, ultraviolet radiation, a target optical length of the ultraviolet propagation, and/or the like. In an embodiment, a width of the housing 702 is selected based on an ultraviolet transparency of the fluid. For example, a wider housing 702 can work well for ultraviolet transparent water, while a narrower housing 702 can work well for ultraviolet opaque water. Overall, a distribution of the intensity of ultraviolet light within the disinfection chamber 714 is affected by the width of the housing 602 and resulting relative positions of the ultraviolet sources 742A, 742B.

When the width of the disinfection chamber 714 is altered, the rate at which the fluid 2A travels through the disinfection chamber 714 will be altered without any other changes in the system. In an embodiment, the control component 20 can adjust operation of a flow device, or the like, to adjust a rate at which the fluid 2A travels through the disinfection chamber 714. The adjustment can be made to maintain the rate at which the fluid 2A is traveling regardless of the width of the disinfection chamber 714. Additionally, the housing 702 can include an interior wall 706, which causes the fluid 2A to flow in a winding manner within the disinfection chamber 714. In an embodiment, the interior wall 706 can be capable of being moved such that a distance between an interior end of the interior wall 706 and the adjustable section 704 of the housing 702 can vary within a range of distances. By varying this distance, one or more characteristics of the flow of the fluid 2A and/or the ultraviolet radiation within the disinfection chamber 714 are altered. The interior wall 706 can be moved using any solution, e.g., complementary threaded sub-sections of the interior wall 706.

Figure 8:
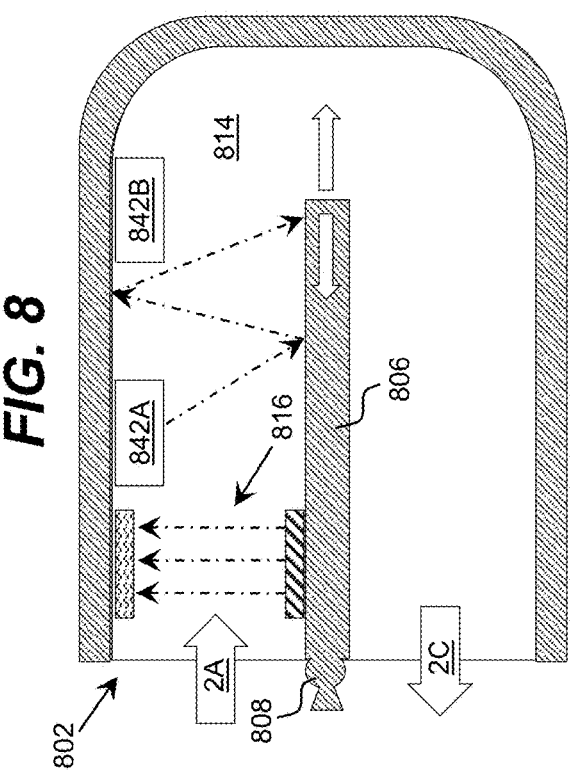
FIG. 8 shows an illustrative housing including an expandable wall according to another embodiment.

FIG. 8 shows an illustrative housing 802 including an expandable wall according to another embodiment. In this case, the interior wall 806 can be expand and/or contract within a range of distances using any solution, e.g., inflation/deflation using an air pump 808, or the like. The expansion and contraction of the interior wall 806 can affect a reflectivity of the interior wall 806, the physical dimensions of the chamber 814, one or more fluid flow characteristics, a target optical length of the ultraviolet propagation, and/or the like. In an embodiment, the control component 20 (FIG. 2) can operate the air pump 808 to expand/contract the interior wall 806 according to one or more parameters of the fluid, ultraviolet radiation, and/or the like. The interior wall 806 can be formed of any material capable of being expanded and contracted including, for example, rubber, polyvinyl chloride, textile-reinforced urethane plastic, and/or the like. While the interior wall 806 is shown as being capable of being inflated/deflated, it is understood that one or more of any section of the housing 802 can be configured for expansion/contraction.

Figure 9:
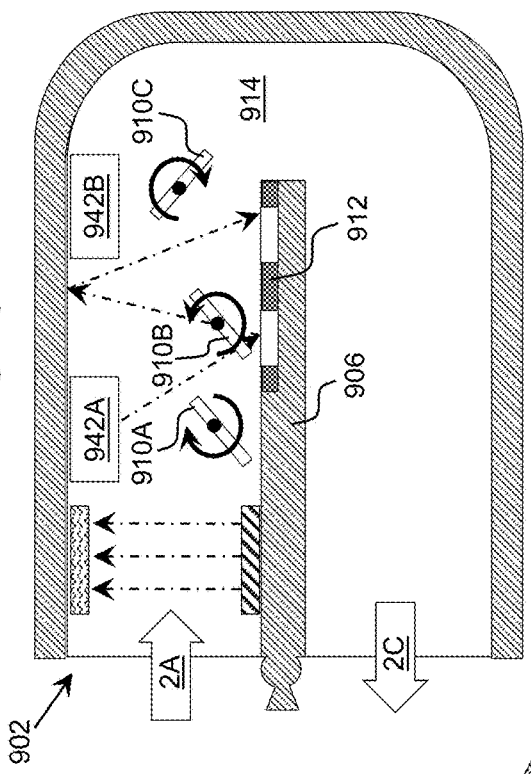
FIG. 9 shows an illustrative housing including a set of rotatable mirrors according to an embodiment.

In an embodiment, a disinfection chamber includes one or more mechanisms for altering the optical path, such as an optical length of the ultraviolet propagation, of the ultraviolet radiation. For example, FIG. 9 shows an illustrative housing 902 including a set of rotatable mirrors 910A-910C according to an embodiment. Each mirror 910A-910C can have a surface reflective of the ultraviolet radiation. In an embodiment, the control component 20 (FIG. 2) can rotate the mirrors 910A-910C in order to alter one or more aspects of the optical path of the ultraviolet radiation. The housing 902 also can include a set of ultraviolet sensors 912, which can generate data corresponding to an amount of ultraviolet radiation emitted from the ultraviolet sources 942A-942B impinging thereon. A long optical path of ultraviolet radiation correlates with a lower signal registered by the set of ultraviolet sensors 912. To this extent, the control component 20 can use data received from the ultraviolet sensors 912 to adjust the mirrors 910A-910C to obtain a target length of the optical path of the ultraviolet radiation.

Further improvement of scattering of the ultraviolet radiation can be obtained by including a plurality of objects floating in the fluid 2A in the disinfection chamber 914. Each of the objects can have an index of refraction for the ultraviolet radiation that is lower than the index of refraction for the ultraviolet radiation of the fluid 2A. In an embodiment, the refractive index is much lower (e.g., at least approximately 0.2 lower) than that of the fluid 2A for the corresponding ultraviolet radiation. For example, when the fluid 2A is water, which has an index of refraction of approximately 1.3, the objects can comprise an index of refraction of approximately 1.1 or less. In a further embodiment, an object comprises a gaseous bubble, such as a bubble of atmospheric air, carbon dioxide, and/or the like. In this case, a bubble generator can be included to introduce the gas/air into the disinfection chamber 914 through a set of inlets. Alternatively, the bubbles can be present in the fluid 2A when it enters the disinfection chamber 914. In another embodiment, an object can comprise a material that will not dissolve within the fluid 2A and can be contained within the disinfection chamber 914. For example, an object can comprise a floater, which can be formed of a material that is sufficiently light to float within the fluid 2A and can be contained within the disinfection chamber 914. In an embodiment, one or more floaters are made of hydrophobic alumina aerogel. Similarly, an embodiment of the disinfection chamber 914 can include one or more turbines, which the control component 20 can operate to increase an amount of mixing of the fluid 2A within the disinfection chamber 914, e.g., based on a transparency of the fluid 2A, a rate of flow of the fluid 2A, and/or the like. In a more specific embodiment, one or more of the turbines can include an ultraviolet source located thereon, which can emit ultraviolet radiation while the turbine is being operated.

Figure 10:
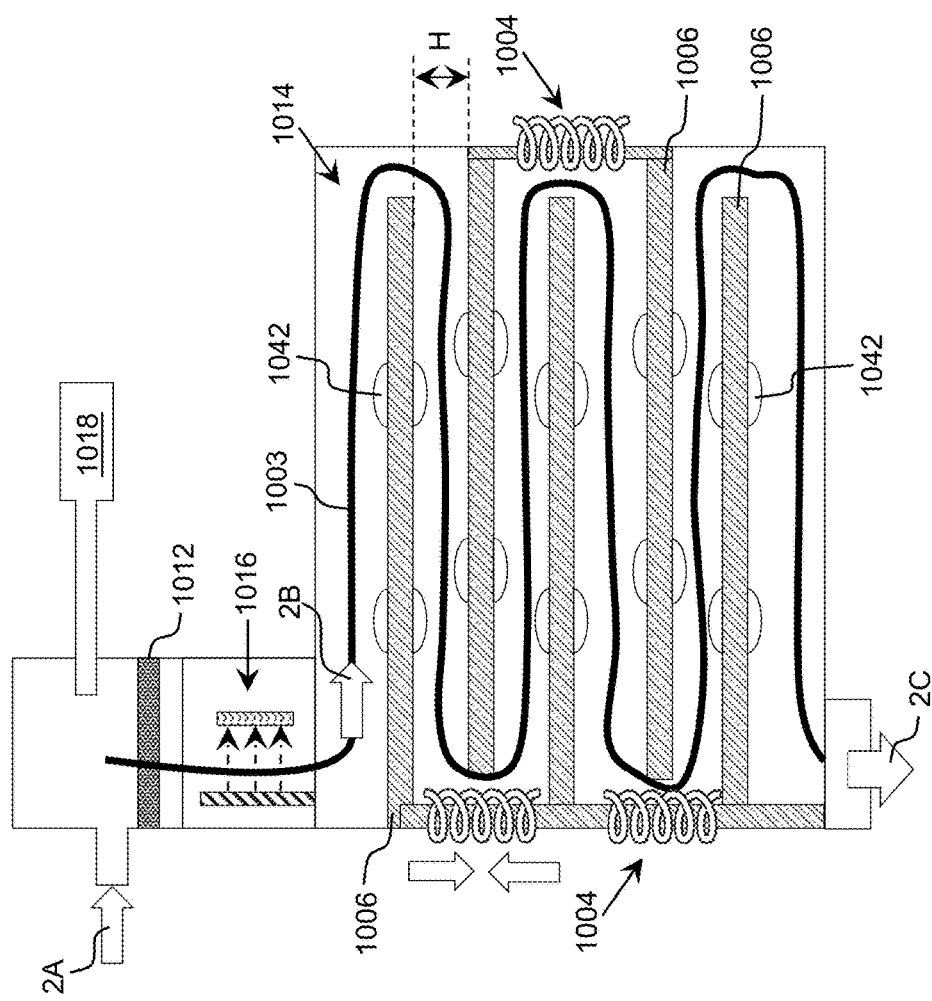
FIG. 10 shows an illustrative disinfection chamber including narrow channels according to an embodiment.

In an embodiment, the fluid 2A can have a low ultraviolet transparency. For such a fluid 2A, the optical path of the ultraviolet light will be small as the ultraviolet light will be absorbed by the fluid 2A. As a result, a distribution of ultraviolet light throughout the fluid 2A can be utilized to provide a more efficient disinfection. FIG. 10 shows an illustrative disinfection chamber 1014 including a plurality of narrow channels according to an embodiment. The channels are formed by a plurality of interior walls 1006, which are configured to cause filtered fluid 2B to flow in a serpentine path 1003 through the disinfection chamber 1014. Each interior wall 1006 can have a set of ultraviolet sources 1042 located thereon, which emit ultraviolet radiation into the filtered fluid 2B in various locations as the filtered fluid 2B flows along the path 1003.

In a further embodiment, a height H of one or more of the channels in the disinfection chamber 1014 can be adjusted, e.g., based on the ultraviolet transparency of the filtered fluid 2B. To this extent, the housing for the disinfection chamber 1014 can include a plurality of adjustable sections 1004, which can be extended and contracted for a range of heights H. When an adjustable section 1004 is extended or contracted, one or more interior walls 1006 will move, thereby causing the channels to become narrower or wider.

In an embodiment, the control component 20 (FIG. 2) can automatically adjust the adjustable sections 1004 based on the ultraviolet transparency of the filtered fluid 2B. To this extent, the control component 20 can obtain data corresponding to the ultraviolet transparency of the filtered fluid 2B from a transparency assembly 1016 located between the disinfection chamber 1014 and a filter component 1012. Based on the data, the control component 20 can adjust the adjustable sections 1004 to narrow or widen the channels. Furthermore, the control component 20 can operate an air pump 1018. The air pump 1018 can be utilized to introduce air into the disinfection chamber, thereby helping to push the filtered fluid 2B through narrow channels in the disinfection chamber 1014. Furthermore, the air pump 1018 can introduce bubbles into the disinfection chamber 1014, which can assist in scattering the ultraviolet radiation emitted therein.

Figure 11A:
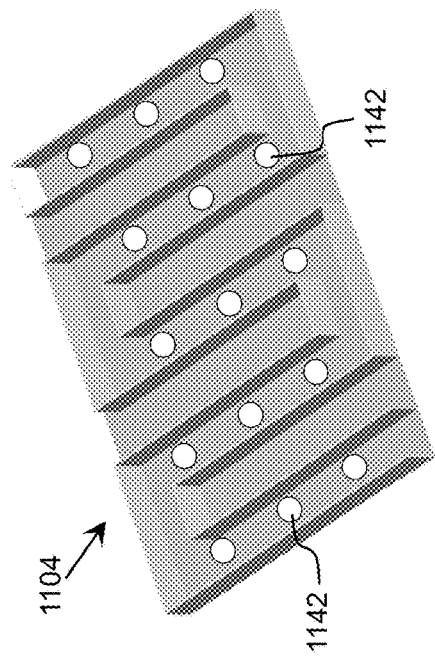
FIGS. 11A-11C show components of an illustrative disinfection chamber according to an embodiment.
Figure 11B:
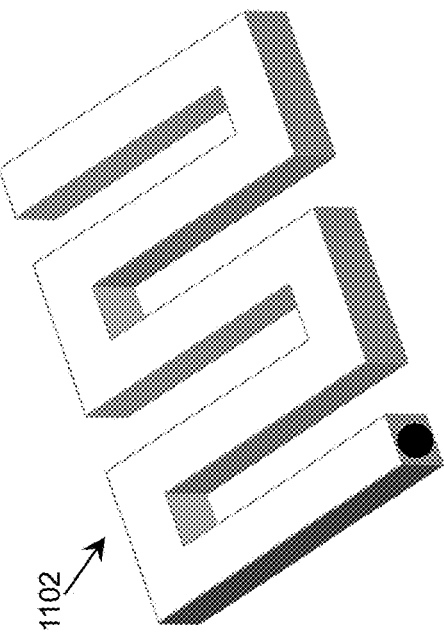
Figure 11C:
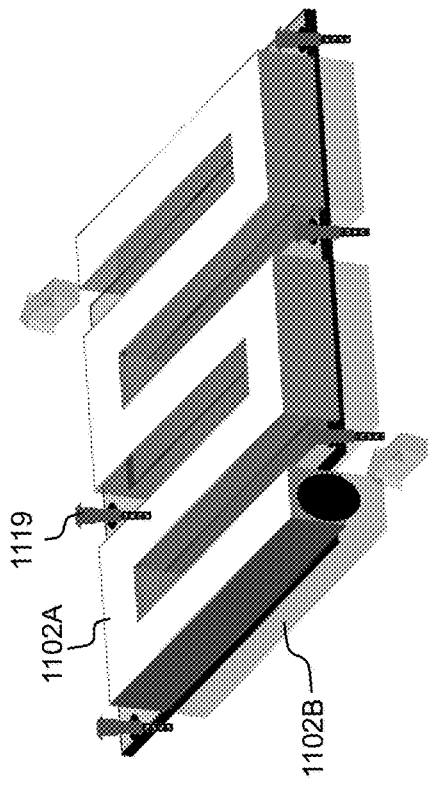

In an embodiment, a disinfection chamber is configured such that none of the disinfection equipment contacts the fluid. To this extent, FIGS. 11A-11C show components of an illustrative disinfection chamber according to an embodiment. In this case, the disinfection chamber can be formed of an ultraviolet transparent tubing 1102 shown in FIG. 11A which is configured to be inserted into a holder 1104 shown in FIG. 11B. The holder 1104 includes a set of ultraviolet sources 1142 for emitting ultraviolet radiation that is directed into the ultraviolet transparent tubing 1102, thereby isolating the electrical components from the flow of the fluid. While not shown, the disinfection chamber can include a second holder 1104 or a top such that the ultraviolet transparent tubing 1102 is completely encapsulated within the two holders 1104 or the holder 1104 and top. Similarly, the holder 1104 can include other electrical components, such as one or more sensors (e.g., ultraviolet sensors, sensors indicating that the tubing 1102 is or is not present, etc.), and/or the like. The transparent tubing 1102 and ultraviolet sources 1142 can be configured to provide sufficient ultraviolet radiation to disinfect a fluid, such as water, flowing through the transparent tubing 1102.

The ultraviolet transparent tubing 1102 can be constructed such that at least thirty percent of the normal incident ultraviolet radiation passes through a side. The ultraviolet transparent tubing 1102 can be formed of fused silica, ultraviolet transparent polytetrafluoroethylene (e.g., Teflon), and/or the like. The holder 1104 can be formed of any material and can have interior surfaces that are reflective of ultraviolet radiation. In an embodiment shown in FIG. 11C, the transparent tubing can be formed of an upper part 1102A and a lower part 1102B, which are removably connected by a set of fasteners 1119 (e.g., screws, clips, or the like). In this case, the upper and lower parts 1102A, 11028 can be disengaged and cleaned to remove residue from previous uses of the transparent tubing.

Figure 12:
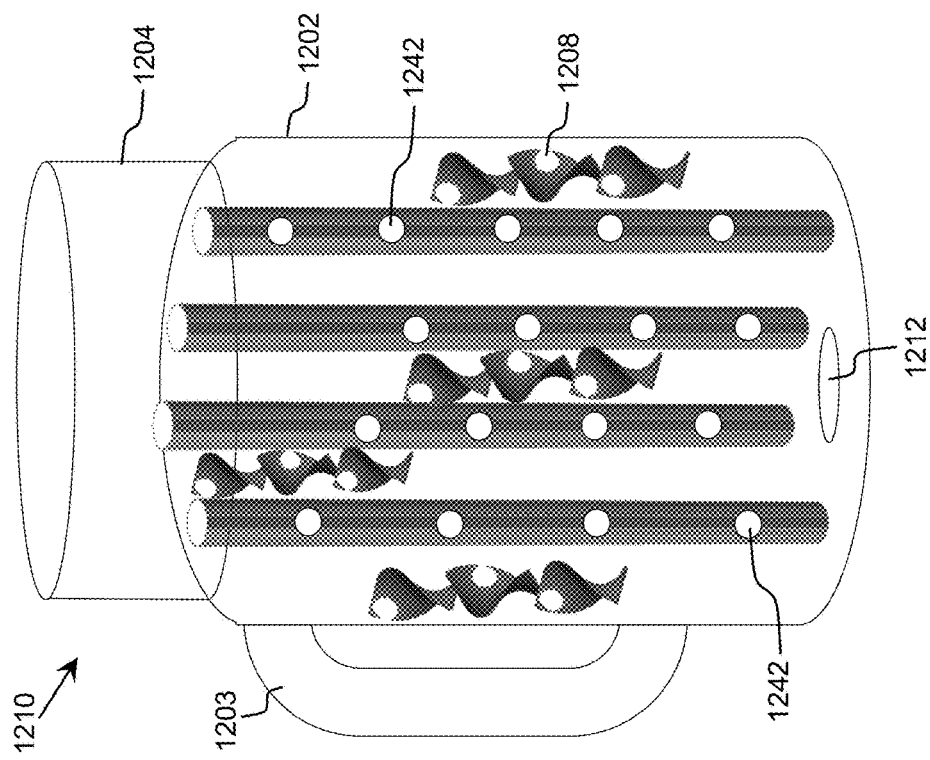
FIG. 12 shows an illustrative portable embodiment of a disinfection system according to an embodiment.

FIG. 12 shows an illustrative portable embodiment of a disinfection system 1210 according to an embodiment. In this case, a disinfection container 1202 includes a handle 1203, which allows a user to hold and shake the disinfection container 1202 to promote mixing of a fluid located therein during disinfection of a fluid located therein. The disinfection container 1202 can be formed of any suitable material and can have an interior surface that is reflective of ultraviolet radiation. The disinfection container 1202 can be closed by a top 1204, which can include a portable power source (e.g., power component 40 of FIG. 2), such as a battery, and control logic (e.g., control component 20 of FIG. 2) for operating a set of ultraviolet sources 1242 distributed throughout an interior of the disinfection container 1202, e.g., on a plurality of rods extending from the top 1204. The disinfection container 1202 also is shown including a plurality of mixing elements 1208, which can float in the fluid and promote mixing of the fluid and/or the ultraviolet radiation during use of the disinfection system 1210. Furthermore, the disinfection container 1202 can include a sensor 1212, which is configured to acquire data corresponding to a degree to which the fluid has been disinfected. In this case, the disinfection system 1210 can include an output device to notify the user when disinfection is complete. In an embodiment, the disinfection system 1210 is configured to disinfect a fluid, such as water, within one minute at a maximum emission intensity (where the maximum emission intensity is determined by the resistance of the circuit, internal resistance of the battery, and the efficiency of the ultraviolet sources 1242).

While embodiments described herein can use diffuse ultraviolet radiation, it is understood that collimated ultraviolet radiation also can be used. Use of collimated ultraviolet radiation also can enable an effective optical path to be increased without requiring a significant increase in the volume of a disinfection chamber. The collimated ultraviolet light can be generated, for example, by an ultraviolet laser diode. Alternatively, a diffuse ultraviolet LED can generate diffuse ultraviolet light, which is subsequently collimated using, for example, a parabolic reflector.

Figure 13:
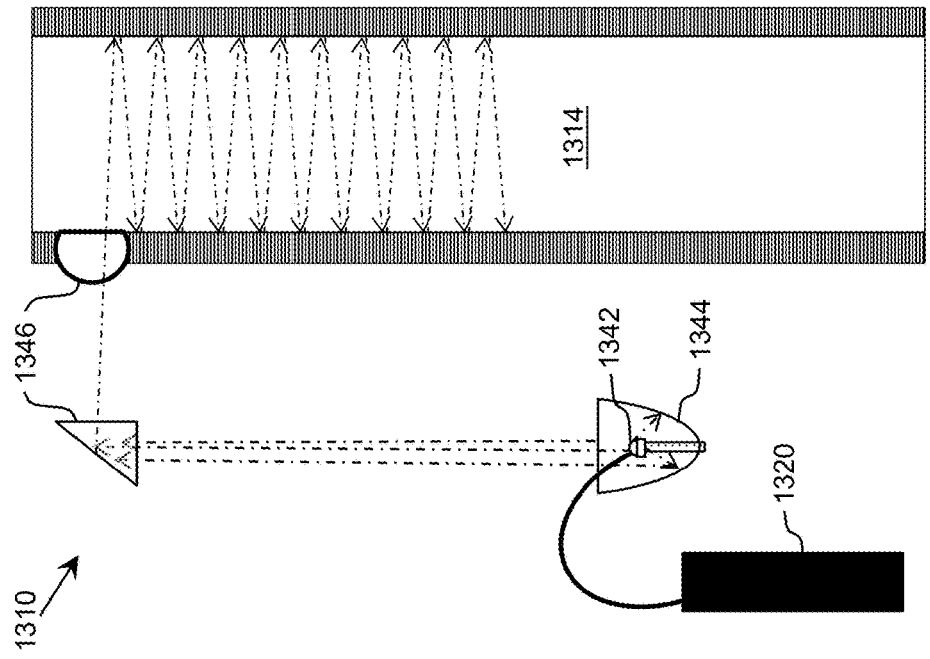
FIG. 13 shows an illustrative disinfection system, which uses collimated ultraviolet radiation according to an embodiment.

To this extent, FIG. 13 shows an illustrative disinfection system 1310, which uses collimated ultraviolet radiation according to an embodiment. The use of collimated ultraviolet radiation can increase an optical path of the ultraviolet radiation. In this case, an ultraviolet source 1342 is located at a focal point of a parabolic reflector 1344. During operation, a control component 1320 can operate the ultraviolet source 1342 to emit diffuse ultraviolet radiation, which reflects off of the parabolic reflector 1344, producing a collimated beam of ultraviolet radiation. A size of the ultraviolet source 1342 can be relatively small compared to a diameter of the parabolic reflector 1344. In an embodiment, the diameter of the parabolic reflector 1344 is at least approximately five times greater than a characteristic size of the ultraviolet source 1342. The parabolic reflector 1344 can be formed of/coated with any material highly reflective of ultraviolet light, such as highly ultraviolet-reflective aluminum. The collimated ultraviolet radiation can be guided into the disinfection chamber 1314 using a set of wave guiding structures 1346. The disinfection chamber 1314 can be formed of walls having a highly reflective interior surface (e.g., highly ultraviolet-reflective aluminum) to prolong the optical path of the ultraviolet radiation.

Figure 14:
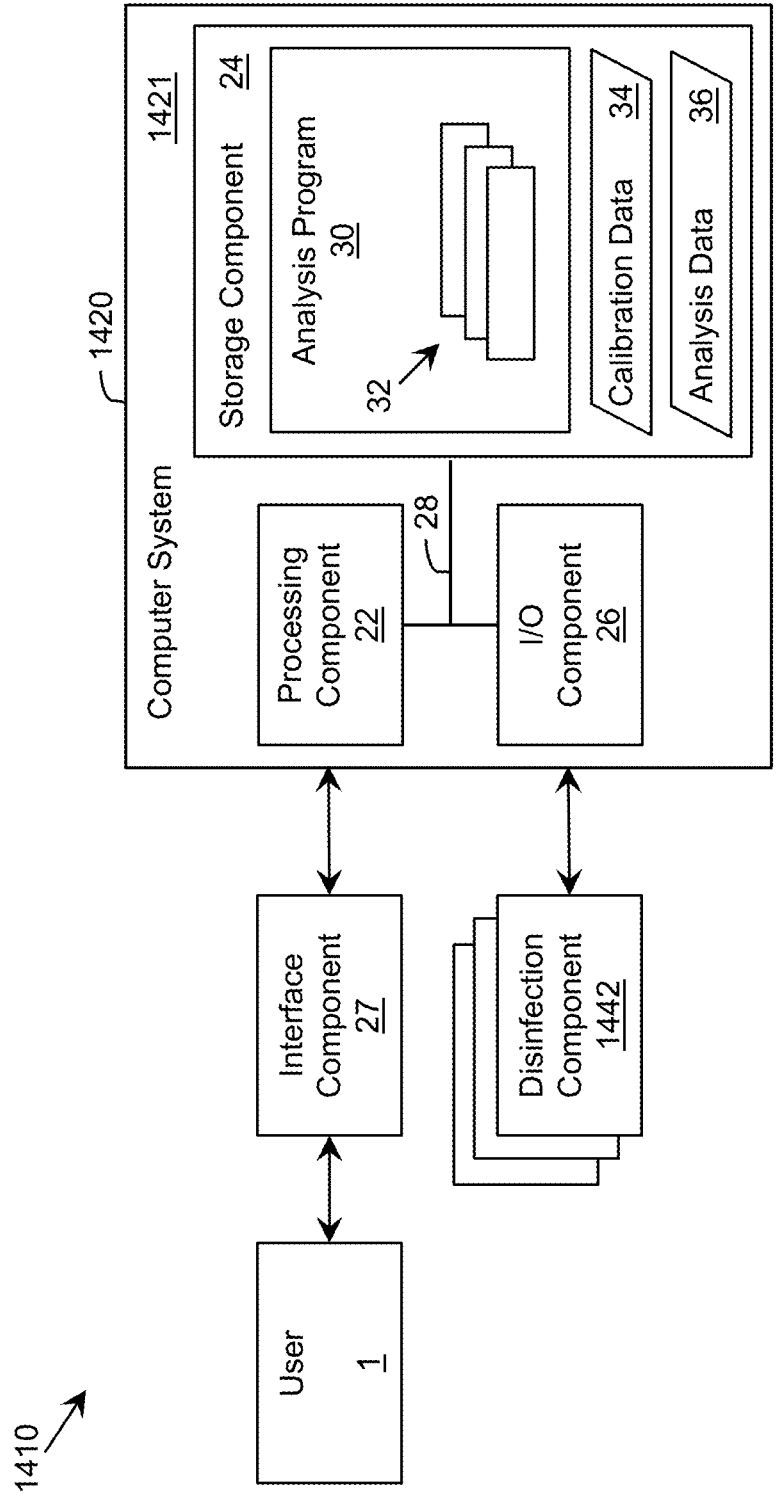
FIG. 14 shows an illustrative disinfection system according to an embodiment.

As described herein, a control component can operate one or more components of a disinfection system to disinfect a fluid. FIG. 14 shows an illustrative disinfection system 1410 according to an embodiment. In this case, the system 1410 includes a monitoring and/or control component 1420, which is implemented as a computer system 1421 including an analysis program 30, which makes the computer system 1421 operable to manage a set of disinfection components 1442 (e.g., a power component, ultraviolet (UV) source(s), sensor(s), valves, pumps, movable walls, etc.) by performing a process described herein. In particular, the analysis program 30 can enable the computer system 1421 to operate the disinfection components 1442 and process data corresponding to one or more conditions of the chamber and/or a fluid present in the chamber.

In an embodiment, during an initial period of operation, the computer system 1421 can acquire data regarding one or more attributes of the fluid and generate analysis data 36 for further processing. The analysis data 36 can include information on the presence of one or more contaminants in the fluid, a transparency of the fluid, and/or the like. The computer system 1421 can use the analysis data 36 to generate calibration data 34 for controlling one or more aspects of the operation of the disinfection components 1442 by the computer system 1421 as discussed herein.

The computer system 1421 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the analysis program 30, which is at least partially fixed in the storage component 24. While executing program code, the processing component 22 can process data, which can result in reading and/or writing transformed data from/to the storage component 24 and/or the I/O component 26 for further processing. The pathway 28 provides a communications link between each of the components in the computer system 1421. The I/O component 26 and/or the interface component 27 can comprise one or more human I/O devices, which enable a human user 1 to interact with the computer system 1421 and/or one or more communications devices to enable a system user 1 to communicate with the computer system 1421 using any type of communications link. To this extent, during execution by the computer system 1421, the analysis program 30 can manage a set of interfaces (e.g., graphical user interface(s), application program interface, and/or the like) that enable human and/or system users 1 to interact with the analysis program 30. Furthermore, the analysis program 30 can manage (e.g., store, retrieve, create, manipulate, organize, present, etc.) the data, such as calibration data 34 and analysis data 36, using any solution.

In any event, the computer system 1421 can comprise one or more general purpose computing articles of manufacture (e.g., computing devices) capable of executing program code, such as the analysis program 30, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the analysis program 30 can be embodied as any combination of system software and/or application software.

Furthermore, the analysis program 30 can be implemented using a set of modules 32. In this case, a module 32 can enable the computer system 1421 to perform a set of tasks used by the analysis program 30, and can be separately developed and/or implemented apart from other portions of the analysis program 30. When the computer system 1421 comprises multiple computing devices, each computing device can have only a portion of the analysis program 30 fixed thereon (e.g., one or more modules 32). However, it is understood that the computer system 1421 and the analysis program 30 are only representative of various possible equivalent monitoring and/or control systems 1420 that may perform a process described herein. To this extent, in other embodiments, the functionality provided by the computer system 1421 and the analysis program 30 can be at least partially implemented by one or more computing devices that include any combination of general and/or specific purpose hardware with or without program code. In each embodiment, the hardware and program code, if included, can be created using standard engineering and programming techniques, respectively. In another embodiment, the monitoring and/or control system 1420 can be implemented without any computing device, e.g., using a closed loop circuit implementing a feedback control loop in which the outputs of one or more disinfection components 1442 (e.g., sensing devices) are used as inputs to control the operation of one or more other disinfection components 1442 (e.g., UV LEDs).

Regardless, when the computer system 1421 includes multiple computing devices, the computing devices can communicate over any type of communications link. Furthermore, while performing a process described herein, the computer system 1421 can communicate with one or more other computer systems, such as the user 1, using any type of communications link. In either case, the communications link can comprise any combination of various types of wired and/or wireless links; comprise any combination of one or more types of networks; and/or utilize any combination of various types of transmission techniques and protocols.

While shown and described herein as a method and system for treating (e.g., disinfecting) a fluid, it is understood that aspects of the invention further provide various alternative embodiments. For example, in one embodiment, the invention provides a computer program fixed in at least one computer-readable medium, which when executed, enables a computer system to treat a fluid as described herein. To this extent, the computer-readable medium includes program code, such as the analysis program 30, which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the analysis program 30, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for treating a fluid. In this case, the generating can include configuring a control component 1420, such as the computer system 1421, to implement the method of treating a fluid as described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:
1. A system comprising:
a disinfection chamber for treating a fluid flowing there through, the disinfection chamber including a set of ultraviolet sources located therein;
a transparency assembly mounted such that at least a portion of fluid entering or within the disinfection chamber passes through the transparency assembly;
a control component configured to adjust operation of the set of ultraviolet sources based on transparency data for the fluid acquired by the transparency assembly; and
means for changing at least one of: a length or a cross-sectional area, of a flow path for the fluid within at least one region of the disinfection chamber to affect an optical path of ultraviolet light emitted by the set of ultraviolet sources, wherein the control component is further configured to operate the means for changing based on the transparency data.

2. The system of claim 1, wherein the transparency assembly includes:
a plurality of radiation sources configured to emit radiation of different wavelengths, wherein at least one of the plurality of radiation sources is configured to emit radiation in an ultraviolet disinfection wavelength range; and
a plurality of radiation sensors configured to generate the transparency data based on radiation detected from at least one of the plurality of radiation sources.

3. The system of claim 1, wherein the control component lengthens an optical propagation length when the fluid is more transparent and shortens the optical propagation length when the fluid is more opaque.

4. The system of claim 1, wherein the means for changing includes a plurality of adjustable sections of housing capable of adjusting at least one of a length or a width of the disinfection chamber.

5. The system of claim 1, wherein the means for changing includes a plurality of rotatable mirrors located within the disinfection chamber.

6. The system of claim 5, wherein the means for changing further includes a set of ultraviolet sensors located within the disinfection chamber for acquiring data corresponding to the optical propagation length.

7. The system of claim 1, further comprising a set of sensors for acquiring contamination data corresponding to a level of contamination of the fluid, wherein the control component is further configured to adjust operation of the set of ultraviolet sources based on the contamination data.

8. The system of claim 1, wherein the disinfection chamber includes ultraviolet transparent tubing through which the fluid flows, and wherein the set of ultraviolet sources are located external from the ultraviolet transparent tubing.

9. The system of claim 1, further comprising a portable power source, wherein the system is configured to be operated while being held by a user.

10. The system of claim 1, wherein the set of ultraviolet sources includes at least one ultraviolet source including phosphor, wherein the ultraviolet source emits ultraviolet radiation having a wavelength of 250 nanometers, and the phosphor converts at least a portion of the radiation to radiation having a wavelength of 280 nanometers.

11. The system of claim 1, wherein the set of ultraviolet sources includes a plurality of ultraviolet sources configured to emit ultraviolet radiation having wavelength spectra of a plurality of distinct maxima, and wherein the control component selectively operates a subset of the plurality of ultraviolet sources based on a target contaminant.

12. A system comprising:
a disinfection chamber for treating a fluid flowing there through, the disinfection chamber including a plurality of ultraviolet sources located therein;
a transparency assembly mounted such that at least a portion of fluid entering or within the disinfection chamber passes through the transparency assembly;
a control component configured to adjust operation of the set of ultraviolet sources based on transparency data for the fluid acquired by the transparency assembly; and
means for changing at least one of: a length or a cross-sectional area, of a flow path for the fluid within at least one region of the disinfection chamber to affect an optical path of ultraviolet light emitted by the set of ultraviolet sources, wherein the control component is further configured to operate the means for changing based on the transparency data.

13. The system of claim 12, wherein the control component lengthens an optical propagation length when the fluid is more transparent and shortens the optical propagation length when the fluid is more opaque.

14. The system of claim 12, wherein the disinfection chamber includes a series of channels for the fluid, and wherein the means for changing includes a set of adjustable sections of housing for adjusting widths of the channels.

15. The system of claim 14, further comprising an air pump configured to introduce air into the disinfection chamber.

16. The system of claim 12, wherein the disinfection chamber includes:
ultraviolet transparent tubing through which the fluid flows; and
a holder, wherein the ultraviolet transparent tubing is configured to be placed in the holder, and wherein the set of ultraviolet sources are mounted on the holder, external from the ultraviolet transparent tubing.

17. The system of claim 16, wherein the ultraviolet transparent tubing is formed of an upper part and a lower part, and wherein the upper part and lower part are removably connected to facilitate cleaning an interior of the ultraviolet transparent tubing.

18. A method comprising:
directing a fluid to flow through a disinfection chamber, wherein the disinfection chamber includes a set of ultraviolet sources and a transparency assembly, and wherein at least a portion of the fluid within the disinfection chamber passes through the transparency assembly;
a control component adjusting operation of the set of ultraviolet sources based on transparency data for the fluid acquired by the transparency assembly; and
the control component changing at least one of: a length or a cross-sectional area, of a flow path for the fluid within at least one region of the disinfection chamber to affect an optical path of ultraviolet light emitted by the set of ultraviolet sources based on the transparency data.

19. The method of claim 18, wherein an optical propagation length is dynamically lengthened when the fluid is more transparent and dynamically shortened when the fluid is more opaque.

20. The method of claim 18, further comprising filtering the fluid prior to the fluid entering the disinfection chamber.

* * * * *